United States Patent
Nikolaus

[11] Patent Number: 5,179,330
[45] Date of Patent: Jan. 12, 1993

[54] CONTROL CIRCUIT FOR AN ELECTRICALLY CONTROLLED SERVO DEVICE

[75] Inventor: Heinrich Nikolaus, Hamburg, Fed. Rep. of Germany

[73] Assignee: Mannesmann Rexroth GmbH, Lohr/Main, Fed. Rep. of Germany

[21] Appl. No.: 588,052

[22] Filed: Sep. 25, 1990

[30] Foreign Application Priority Data

Sep. 25, 1989 [DE] Fed. Rep. of Germany ...... 3931962

[51] Int. Cl.$^5$ ............................................. G05B 19/04
[52] U.S. Cl. ................................... 318/567; 318/620
[58] Field of Search ............. 318/620, 631, 687, 696, 318/567, 599, 644, 645; 137/625.65, 529; 60/452, 414

[56] References Cited

U.S. PATENT DOCUMENTS

| | | | |
|---|---|---|---|
| 4,386,626 | 6/1983 | Hehl | 137/529 |
| 4,833,593 | 5/1989 | Takeuchi et al. | 318/696 |
| 4,920,748 | 5/1990 | Kordak et al. | 60/414 |
| 4,928,487 | 5/1990 | Nikolaus | 60/414 |
| 4,970,941 | 11/1990 | Reinhardt | 137/625.65 |

FOREIGN PATENT DOCUMENTS

| | | |
|---|---|---|
| 0075507 | 8/1986 | European Pat. Off. . |
| 0301568 | 2/1989 | European Pat. Off. . |
| 1801137 | 4/1970 | Fed. Rep. of Germany . |
| 2232566 | 1/1974 | Fed. Rep. of Germany . |
| 2916174 | 4/1979 | Fed. Rep. of Germany . |
| 2903978 | 8/1980 | Fed. Rep. of Germany . |
| 3037335 | 5/1981 | Fed. Rep. of Germany . |
| 3044515 | 6/1982 | Fed. Rep. of Germany . |
| 3407920 | 9/1985 | Fed. Rep. of Germany . |
| 3430551 | 2/1986 | Fed. Rep. of Germany . |
| 3546336 | 7/1987 | Fed. Rep. of Germany . |
| 3623651 | 1/1988 | Fed. Rep. of Germany . |
| 3819122 | 12/1989 | Fed. Rep. of Germany . |

OTHER PUBLICATIONS

DE-Z: Vrancken, Hans Peter, Elektronik fur die Hydraulik, In: VDI-Z, Bd. 128, 1986, Nr. 21-Nov. (1), pp. 859-864.

DE-Z: Scholz, D., Aachen, Ventilansteurung und-regelung mit digitaler Signalverarbeitung, In: d+p-olhydraulik und pneumatik 29, 1985, Nr. 1, pp. 21-24.

Primary Examiner—William M. Shoop, Jr.
Attorney, Agent, or Firm—Harness, Dickey & Pierce

[57] ABSTRACT

A control circuit includes a microprocessor, a table store and an amplifier stage to control a controlled device which has a non-linear or linear, but discontinuous response curve. To obtain a linear response curve of the controlled device the table store is loaded with a response curve map in operating the controlled device. Thereafter the data loaded in pairs in the table store are inversely read-out and used as a control signal for the controlled device. The table store thus allows to linearize the response curve of the controlled device. In addition the data may be modified. According to the invention any correcting means to obtain an ideal response of the controlled device is eliminated. The invention provides for an optimum performance, smallest possible expenditure of circuitry and shortest possible control time.

13 Claims, 4 Drawing Sheets

CONTROL CIRCUIT FOR AN ELECTRICALLY CONTROLLED SERVO DEVICE

BACKGROUND OF THE INVENTION

The present invention relates to a control circuit for an electrically controlled device. In particular, the invention relates to controlled devices having an arbitrary, for example a non-linear or, respectively, a linear but non-continuous response curve or map of response curves.

Although the present invention is not restricted to valve devices in hydraulic systems, but may be applied to different types of controlled devices, such as transistors or general control systems and thus is applicable to a broad variety of systems using a controlled device which receives an electrical input signal and delivers an electrical, mechanical, hydraulic or pneumatic output magnitude for actuating a power member, wherein input and output magnitudes are correlated in a non-linear relation, the embodiments of the present invention explained below relate to a hydraulic system, as preferably proportional directional solenoid valves exhibit a high grade non-linear response which makes necessary a correction of the response curves.

The art contains a number of correction circuitries, e.g. a control circuit for a valve (German 29 16 172) in which the desired input value is digitalized, correction values correlated to the desired value are read out from a read-only memory, the correction values are added to the desired value and the corrected desired signal is converted again to an analog magnitude. Furthermore, different circuitries for controlling valves make use of microprocessors including read-only memories or table stores to provide correcting the response curve.

An object of the present invention, is to ensure a desired response of a controlled device by using means of minimum expenditure. A further object is to recognize the relationship between the input and output signal of the controlled device in a shortest possible time to handle the correction quickly and efficiently.

SUMMARY OF THE INVENTION

According to the present invention a control circuit for an electrically controlled controlled device for actuating a power member is provided, wherein a microprocessor receives a desired value for said controlled device and delivers a control magnitude for the controlled device and wherein a memory is connected to the microprocessor, which circuit is characterized in that the response curve of said controlled device to actuating the power member is stored in the memory, wherein the response curve is composed of a number of pairs of input magnitudes and correlated output magnitudes of the controlled device, that in the control mode of the controlled device an output magnitude defining a desired value is delivered to the microprocessor and that the input magnitude correlated to said desired value is read out from the memory defining a control signal which is delivered to said controlled device.

A substantial advantage of the present invention is to eliminate a control loop for feeding back the output magnitude so that the expenditure of the circuitry is substantially reduced. As long as the data determined in operating the controlled device in a testing mode and read in a memory are used thereafter in a control mode for controlling the controlled device, one automatically obtains a linear and the relationship between the input signal of the microprocessor and the output signal of the controlled device. Furthermore, the data read in the memory may be arbitrarily varied which results in a corresponding modification of the linearized response.

The circuitry according to the present invention provides for a further advantage that the output signal of the microprocessor is a pulse width modulated signal which can be directly delivered to the signal input terminal of an amplifier to amplify the control signal. Further the output signal of the microprocessor may be corrected, for example increased or decreased by increments to shift the output magnitude of the controlled device when disturbance variables occur.

According to the invention the calculating operations necessary with prior art control circuits are reduced to a simple data exchange thus minimizing the control time.

BRIEF DESCRIPTION OF THE DRAWINGS

Other advantages and features of the invention will appear from the following description of a number of non-limiting embodiments with reference to the figures which show.

DESCRIPTION OF THE PREFERRED EMBODIMENTS

Figure 1:
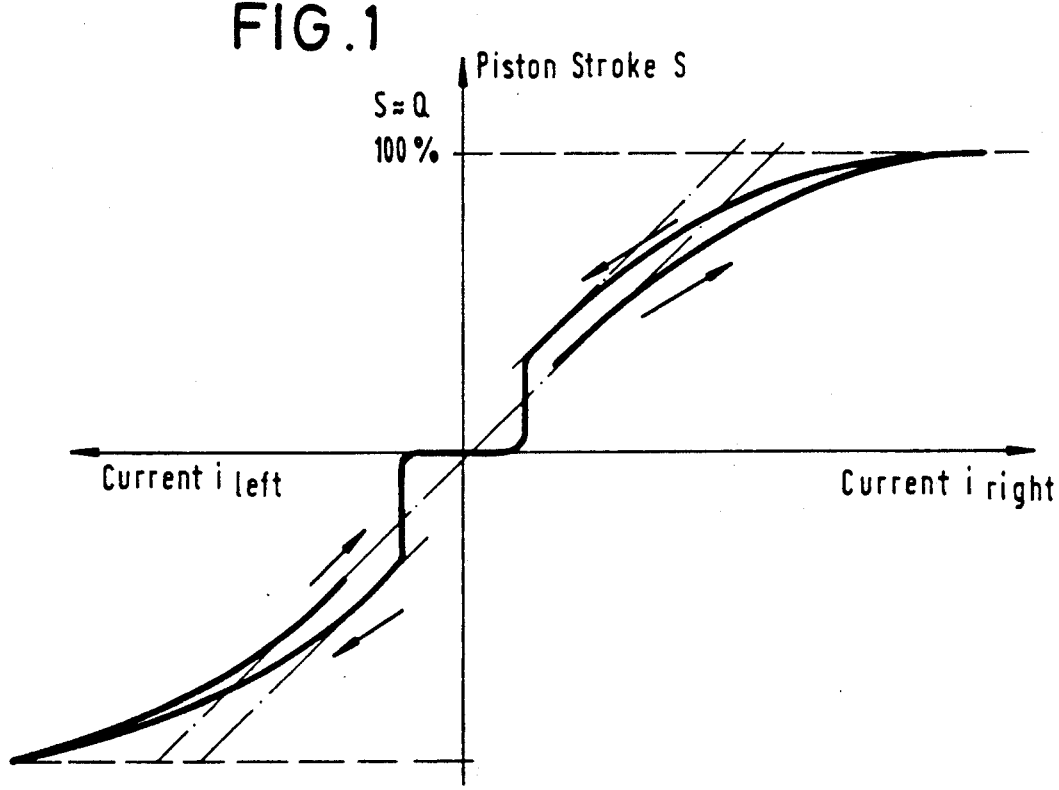
FIG. 1 a response curve of a proportional directional solenoid valve

FIG. 1 shows the known response curve of a proportional directional valve. After continuously increasing the magnitude i in the coil of the valve the current reaches a predetermined value and the control piston moves out of the overlapping range and reaches positions of a progressive relationship within the operational range of the fine control grooves, i.e. relatively small variations of the current i result in large deviations of the piston stroke. Towards the end of the operational range the piston is moved into a saturating range until the control piston stops at a limiting abutment. Due to frictional losses there is further a hysteresis as indicated by arrows in FIG. 1. In addition the response curve changes in response to the viscosity of the fluid and the electrical resistance of the coil which both are responsive to temperature. In controlling the opposite coil to move the control piston towards the opposite direction a similar response curve results.

Figure 2:
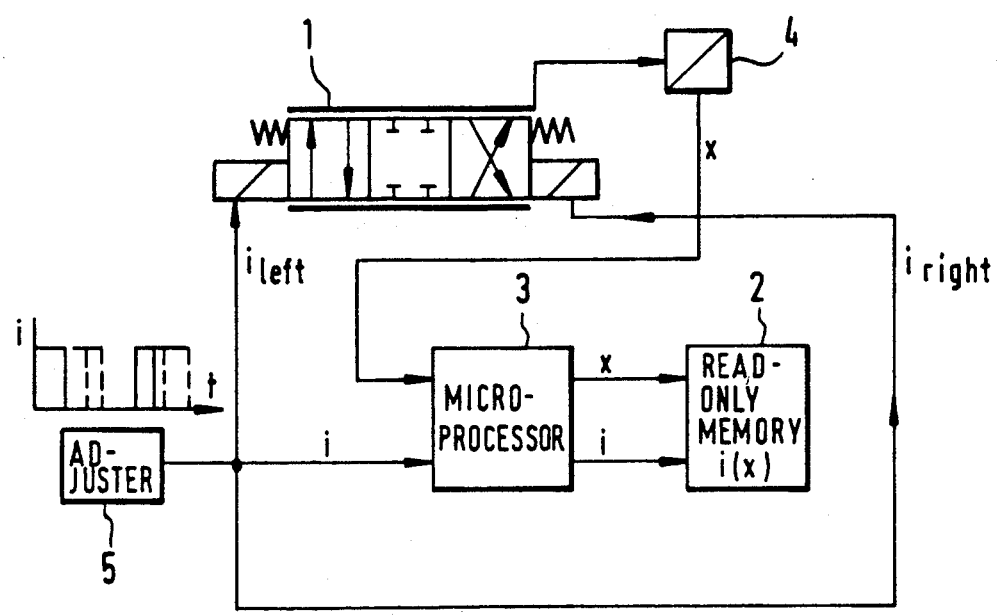
FIG. 2 a diagram illustrating storing the response curve of a proportional directional valve in a read-only memory, FIG. 3 a diagram of a control circuit, FIG. 4 various signal shapes of the control signal, FIGS. 5 to 8 valve response curves with a superimposed Dither signal FIG. 11 a schematic circuitry for storing a pressure response curves in a memory, FIG. 12 a schematic circuitry for storing a power response curve in a memory, FIGS. 13 to 15 valve response curves of varying slope for adjusting sensibility.

According to FIG. 2 the response curve of the valve 1 is measured and the magnitudes determined are stored in pairs in a read-only memory 2. A microprocessor 3 is used which receives the stroke magnitude x of the valve control piston from a stroke transducer 4 as well as the magnitude i from an adjuster 5 which is fed to the coil of the valve 1. Both magnitudes, i.e. the stroke x and the current i are digitalized in a converter not shown. These magnitudes belonging together in pairs are stored in a read-only memory 2 defining a table. The current magnitude i is represented by a pulse width modulated signal as known per se. The stroke magnitude x is stored in the address and the correlated magnitude i is stored at the addressed location in the memory 2. It should be noted that it is sufficient to store the response curve resulting in controlling just one of the coils as the response curve of the other coil is characterized by equal values for current and stroke.

Figure 3:
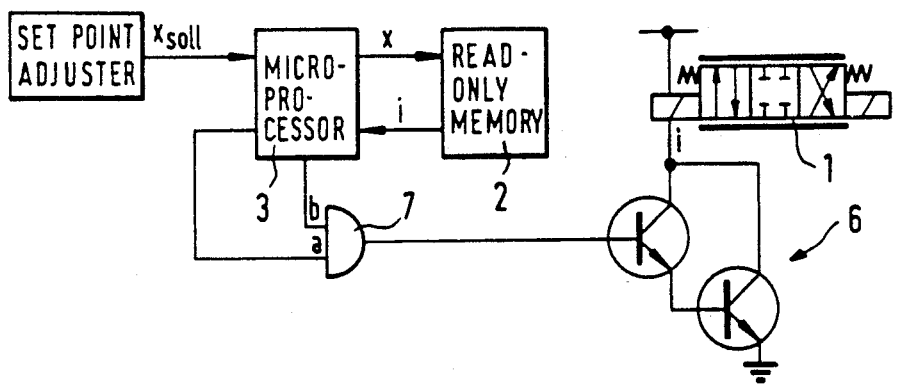

FIG. 3 shows a control circuit for the directional valve 1. The control circuit comprises a table store 2, a microprocessor 3, a Darlington amplifier 6 consisting of a pair of transistors and an AND gate 7 which is explained below. It is assumed that the input b of the AND gate receives a signal so that the output of the microprocessor 3 received by the input a is connected through.

The microprocessor 3 receives a desired value determining a certain stroke x of the valve 1. This desired value for the stroke magnitude is used to address the correlated location in the table store 2 and to read-out the current magnitude i from said location in accordance with the address. The current magnitude defines a pulse width modulated signal which is fed from the microprocessor to the amplifier which output current $i_x$ excites the coil so that the control piston performs a stroke x which corresponds to the current $i_x$. When the desired stroke value is changed the corresponding current stored in the memory is read-out and used to control the stroke of the valve. Accordingly the coil of the valve is automatically controlled such that a linear response curve results as the dotted line in FIG. 1 shows.

Whereas the current magnitude represents the input to the valve and the stroke magnitude x presents the output produced by the valve when the data are read in the memory 2 according to FIG. 2, a desired magnitude for the stroke x is fed to the memory via the microprocessor 3 and the correlated current i is produced as an output of the memory when the valve is to be controlled according to FIG. 3. In this way the linear response curve of the valve is generated.

Figure 4:
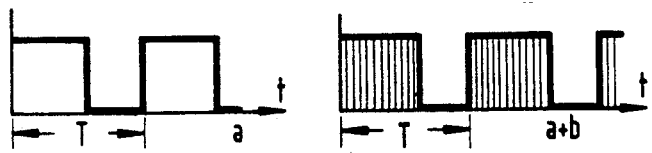

FIG. 4 shows samples of the pulse width modulated control signal at the output of the microprocessor 3. The mean value of the control signal can be reduced when being superimposed with a signal of higher frequency which is pulse width modulated alike. The superimposition is performed in the AND gate 7 the input b of which receives the higher frequency signal. As long as the pulse of the higher frequency signal is supplied to the AND gate the output signal of the microprocessor 3 is connected through to the amplifier 6. The mean value of the control signal to the amplifier is thus additionally reduced due to the pulse width of the higher frequency signal. For example, this is used to adjust the current magnitude when a valve with a smaller nominal current shall be actuated by using the same circuitry.

The embodiment shown in FIGS. 2 and 3 relates to loading and reading out data defining stroke values of a solenoid valve. It is further considered to store a family of response curves of a directional valve when response curves determined at varying temperatures corresponding to the viscosity of the fluid and response curves at varying pressures in response to the flow load function of the valve are stored.

Figure 5:
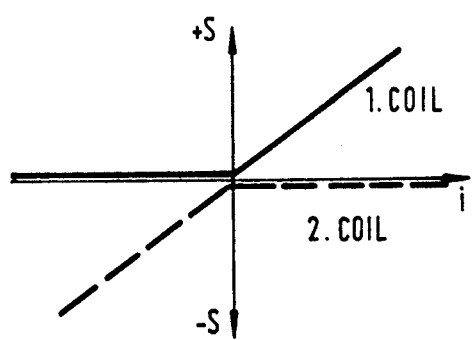

FIG. 5 shows that the linearized response curve of the valve is composed of a pair of superimposed half curves so that it is possible to control the one as well as the other solenoid of the valve using a single stroke response curve read in the memory. Each half curve is composed by the zero values stored in the memory for the left or, respectively the right branch of the abscissa in FIG. 5 and the magnitudes for the response slope so that both the half curves shown in FIG. 5 (continuous and dotted) result in the complete valve response curve. The zero position of the valve in which both coils of the valve are currentless is determined by defining an offset value in the microprocessor 3.

Figure 6:
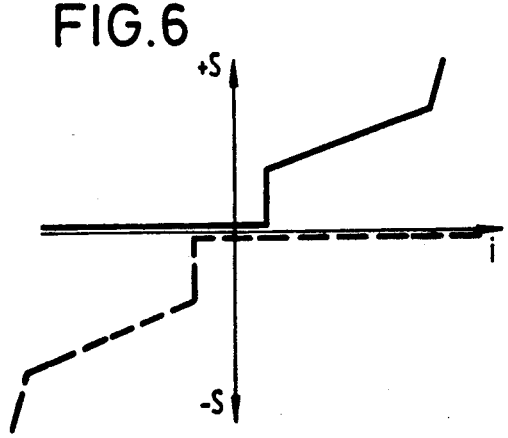

By modifying the data read in the locations of the memory the response curves may be arbitrarily modified. For example FIG. 6 shows a response curve according to which a linear slope is provided on either side of the dead band.

Figure 7:
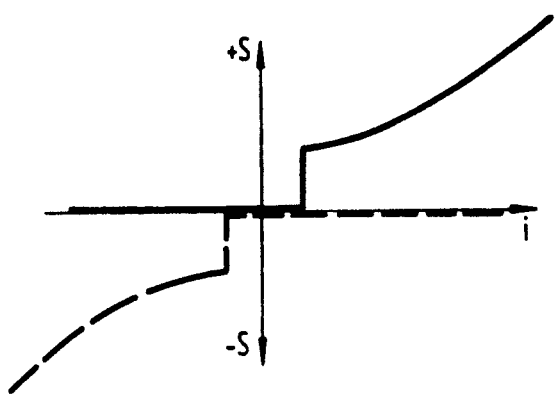

FIG. 7 further shows a dead band and a progressive flow response of a valve, wherein relatively large current modifications result in small stroke changes so that the valve exhibits a fine control function which is electronically produced.

Figure 8:
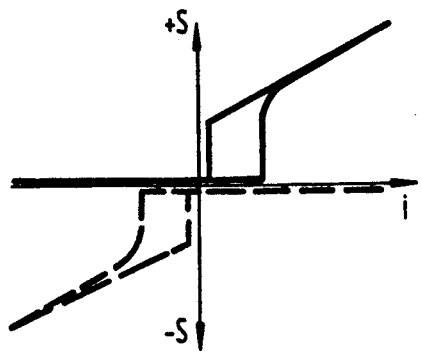

FIG. 8 shows an offset response curve to control a power member via a servo valve (broad dead band) or to control a power member in a closed loop (narrow dead band).

Figure 9:
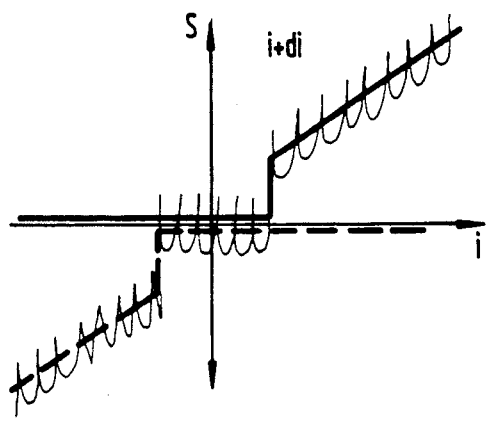
Figure 10:
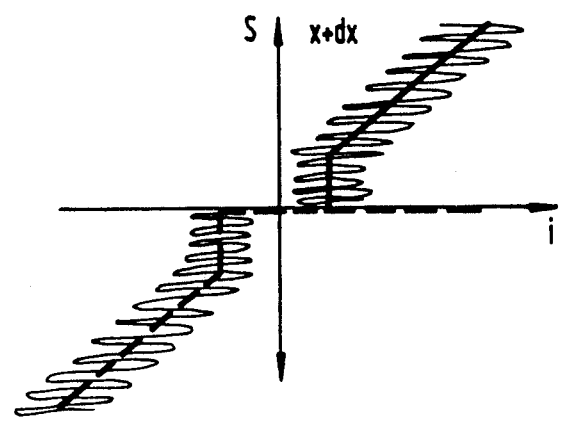

FIG. 9 shows controlling the valve with a superimposed Dither signal wherein the current magnitude i read out from the memory is superimposed with a Dither signal. This eliminates the hysterese of the valve. However, when the input set point x for the stroke is superimposed with a Dither signal as shown in FIG. 10, alternately different addresses in the memory 2 are addressed and alternately different current magnitudes are read out. Accordingly the response curve is shaped as shown in FIG. 10. Again this eliminates the hysterese of the valve, but further the dead band or, respectively the overlapping range of the valve in the neutral position is governed by superimposing the input signal of the memory with the Dither signal. Accordingly the magnitude of the Dither signal increases or decreases the overlapping range as well as modifies the transfer range so that the operation of the valve in the overlapping range and fine control range is modified.

FIG. 10 further shows that the response curve of the valve may be parallel offset by addressing corresponding locations of the memory. In addressing a corresponding memory location the stroke of a valve may be incrementally decreased or increased in response to a disturbance magnitude in the hydraulic system. For example this is useful with hydraulic systems in which a number of consumers receive fluid from a varying displacement pump. As long as the consumers require higher fluid volumes a disturbance magnitude is generated which is used to address a corresponding memory location in order to incrementally increase the control signal for the pump adjustment to increase pump delivery. Contrarily, when the volume delivered by the pump is not sufficient, although the pump already delivers the maximum volume, a disturbance signal is generated by means of which a corresponding memory location in the memory is addressed to read out a decreased current magnitude for the valves to reduce the stroke of the solenoid valves controlling the pump to decrease pump delivery and thus the flow volume to the consumers.

Figure 11:
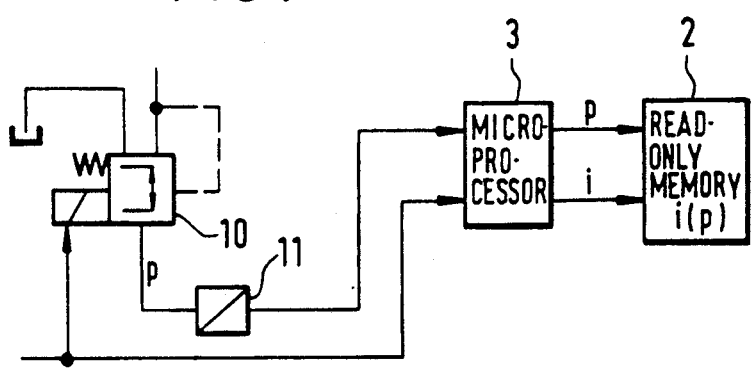
Figure 12:
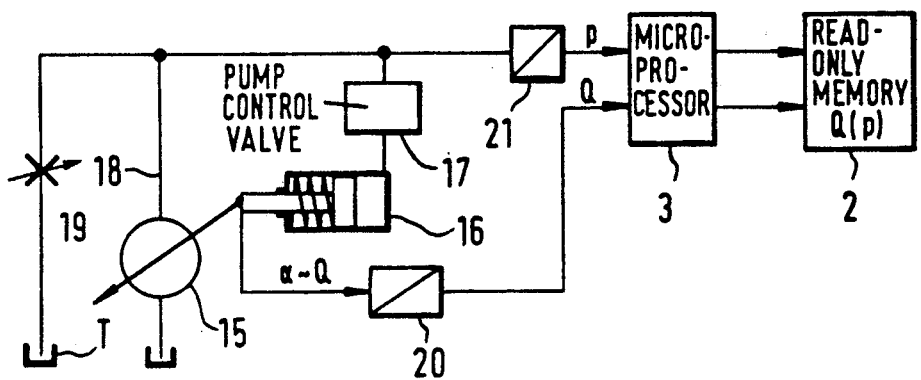

Instead of a response map relating to the stroke response of a valve the memory may be loaded with a map characterizing the flow of fluid through a valve, the pressure magnitudes controlled by a valve or by the power response curve of a varying displacement pump. To load a flow response curve the flow magnitudes of the valve are measured and these magnitudes are loaded together with the correlated current magnitudes. For loading the memory with a pressure response map the current magnitude driving the pressure control valve seen in FIG. 11 is loaded together with the correlated pressure magnitude measured in a sensor 11 via the microprocessor 3 in the memory 2. FIG. 12 illustrates an embodiment for loading a power responsive map. A varying displacement pump 15 is adjusted by a cylinder 16 governed by a pump control valve 17. The pump delivers fluid to a line 18 which is connected through an adjustable throttle 19 to the reservoir T. The cylinder 16 determines the displacement volume of the pump 15 which volume is proportional to the pump pivot angle $\alpha$. A transducer 20 measuring the stroke thus represents the flow magnitude Q. The pressure p occuring upstream of the throttle 19 is measured in a pressure transducer 21. The correlated magnitudes of pressure p and flow Q are read in a memory 2 through a microprocessor 3. Thus one obtains a response map for the power of the pump. This response map loaded in the memory is used to control the pump control valve 17 when the flow magnitude defining a desired value or set point is fed to the microprocessor to address therewith the correlated pressure magnitude loaded in the memory 2 for controlling the pump control valve.

Figure 13:
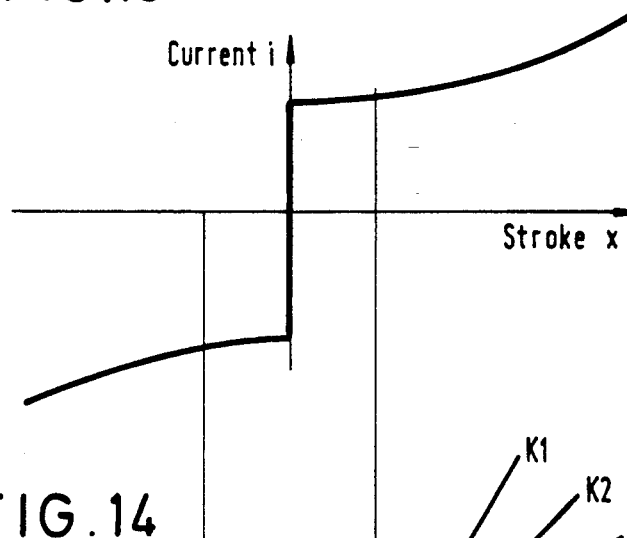
Figure 14:
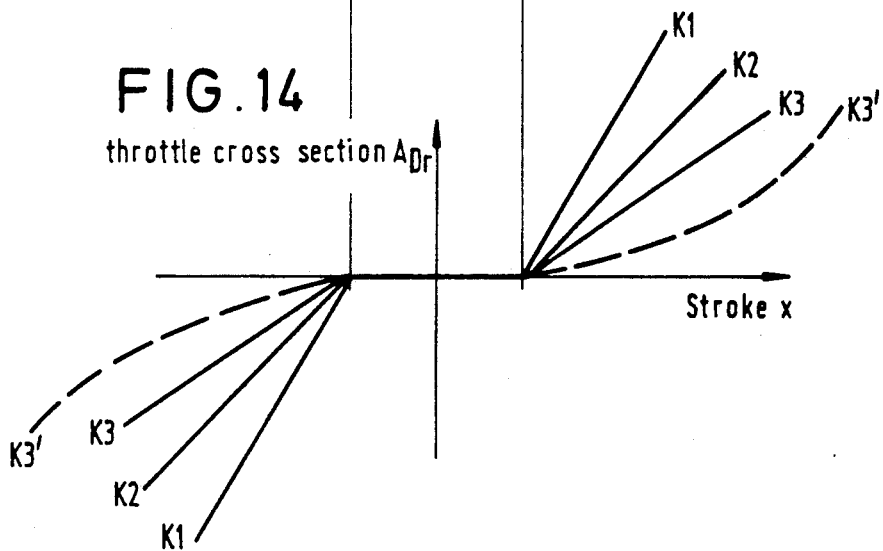
Figure 15:
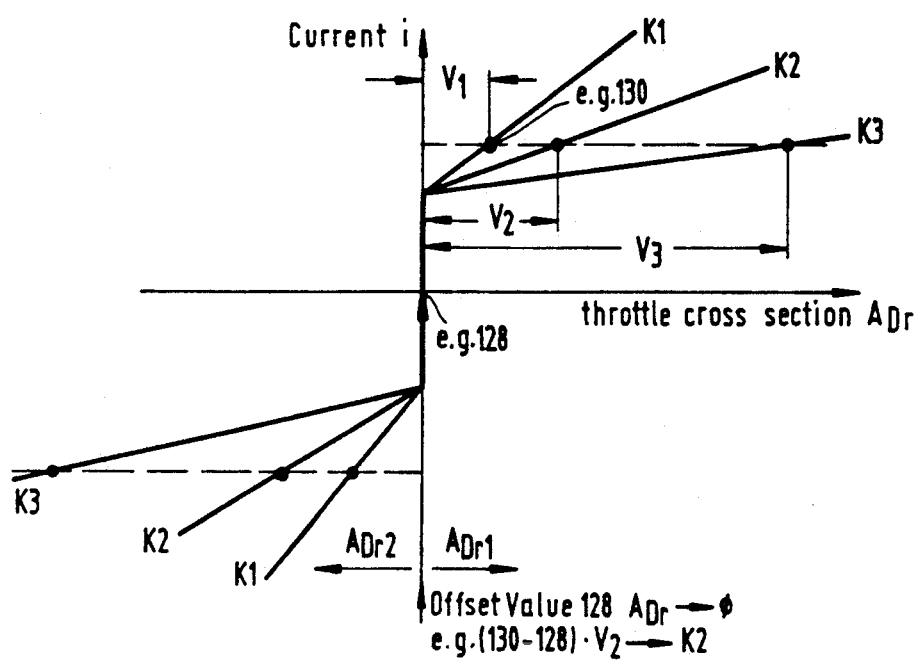

A further embodiment to modify the response curve is shown in FIGS. 13 to 15. In many cases the sensitivity of an adjuster or adjusting means to control the device is to be modified, for example in order to obtain a coarse control or, respectively a fine control as determined by different levels of sensitivity. It is explained below how the sensitivity may be corrected or selected by means of the table store. For example, the response curve of a proportional solenoid valve is shown in FIG. 13, wherein the horizontal line marks the stroke x and the vertical line the current i. FIG. 14 shows the throttling cross section A in response to the stroke x, wherein the response curve K1 of the valve is read in the table store. From this results FIG. 14 illustrating the response curve K1 in response to the current i and the throttling cross section A. As mentioned before the zero position of the valve is determined by the offset value in the microprocessor. Based on this offset value the response curve K1 shall be modified in order to obtain different response curves K2 or K3 for example. Each response curve is characterized by a corresponding distortion factor $V_1$, $V_2$ or $V_3$ such that the slope of the response curve K1 may be modified by selecting one of the distortion factors. To this end a selected address of the response curve K1 loaded in the memory minus the offset address is multiplied with a selected distortion factor so that a different response curve K2 or K3 is obtained. The distortion factors are represented in the microprocessor by an analog input signal for example in order to create any desired response curve slope. It is thus possible in a simple manner by using the memory to continuously modify the response curve of the controlled device to adjust the sensitivity desired in actuating a power member. Correspondingly any manufacturing tolerances of adjuster may be compensated by modifying the response curve in the memory and thus the sensitivity.

What is claimed is:

1. A control circuit including a set point adjuster for an electrically controlled device for actuating a power member, in particular for a controlled device having a non-linear or linear non-continuous response curve, including a microprocessor for receiving a desired magnitude for the controlled device and for delivering a control magnitude for said controlled device and further including a memory connected to said microprocessor, characterized in that the response curve of the controlled device actuating said power member is stored in said memory, said response curve being composed of a number of input magnitudes and correlated output magnitudes of said controlled device, that for controlling the controlled device the desired magnitude corresponding to a desired output magnitude of the response curve is supplied to the microprocessor and that an input magnitude linearly correlated to said desired output magnitude is read-out from the memory, said input magnitude defining a control signal indicative of said control magnitude which is delivered to said controlled device, and wherein the sensitivity of the set point adjuster is modified by modifying the input or output magnitudes of the response curve stored in said memory using an offset value and a distortion factor.

2. The control circuit of claim 1 wherein the memory is loaded with a family of response curves.

3. The control circuit of claim 1 or 2, wherein the data loaded in the memory are modified to produce modified response curves for the control device.

4. In a hydraulic system including a controlled device and a pump, a set point adjuster and a control circuit for controlling the controlled device by an electrical signal, including a microprocessor for receiving a desired magnitude for the controlled device and for delivering a control magnitude for the controlled device and further including a memory connected to said microprocessor, wherein the memory is loaded with pairs each of input magnitudes and correlated output magnitudes of the controlled device defining a family of response curves representing the stroke of the controlled device, flow through the controlled device, pressure controlled by the controlled device or the output power of the pump, wherein for controlling the controlled device the desired magnitude corresponding to a desired output magnitude of the response curve is supplied to the microprocessor, wherein an input magnitude linearly correlated to the desired output magnitude is read-out from the memory, said input magnitude defining a control signal indicative of the control magnitude which is delivered to the controlled device and wherein the sensitivity of the set point adjuster is modified by modifying the input or output magnitudes of the response curves stored in said memory using an offset value and a distortion factor.

5. The control circuit of claim 4 wherein the controlled device comprises a valve having a valve control member and wherein the valve response curve, in particular the overlapping range of the valve control member is modified by arbitrarily modifying the data loaded in the memory.

6. The control circuit of claim 4 wherein the zero point adjustment of the set point adjuster is compensated by modifying the offset value in the memory.

7. The control circuit of claim 4 wherein the control signal read-out from the memory is superimposed with a Dither signal in the microprocessor.

8. The control circuit of claim 4 wherein a desired magnitude read in the memory is superimposed with a Dither signal in the microprocessor.

9. The control circuit of claim 1 wherein the output signal of the microprocessor defines a pulse width modulated signal to control an amplifier stage for the controlled device.

10. The control circuit of claim 9 wherein the pulse width of the control signal is modified by superimposing a pulse width modulated signal of higher frequency.

11. The control circuit of claim 9 wherein the control signal supplied by the microprocessor is incrementally increased or decreased when a disturbance magnitude occurs.

12. The control circuit of claim 11 wherein the desired magnitude loaded in the memory is increased or decreased when a disturbance magnitude occurs to increase or to decrease the control signal.

13. The control circuit of claim 11 wherein the pump comprises a varying displacement pump and wherein the displacement volume of the displacement pump and the flow rate to the controlled device is modified to control the pump displacement volume and the flow rate to the controlled device.

* * * * *